Sept. 26, 1950          N. FELICI          2,523,688
ELECTROSTATIC MACHINE
Filed Feb. 9, 1946
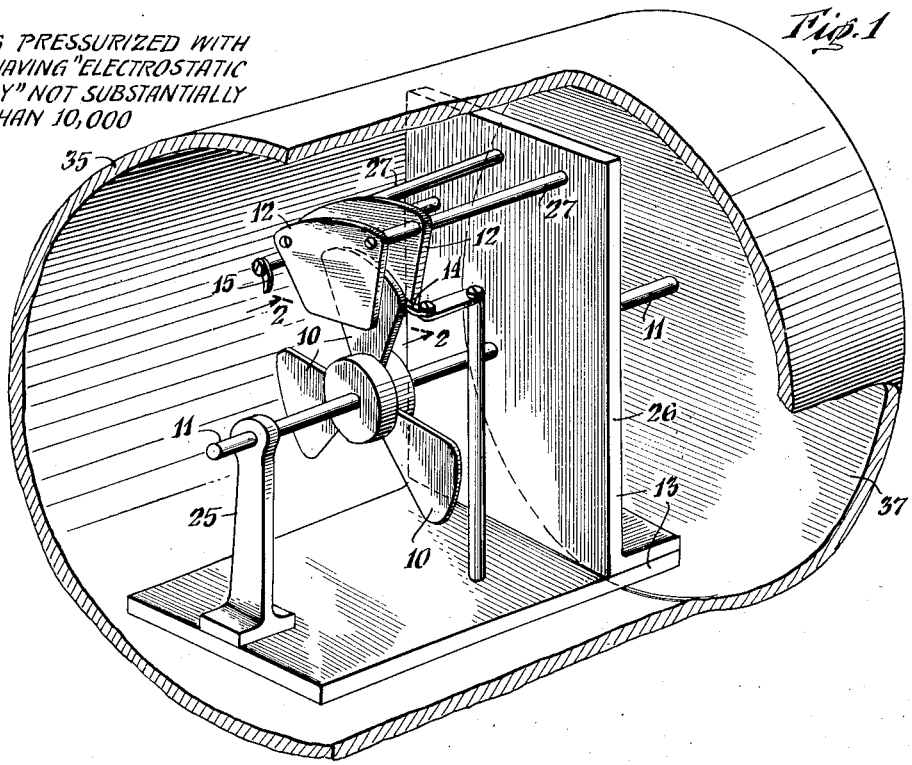
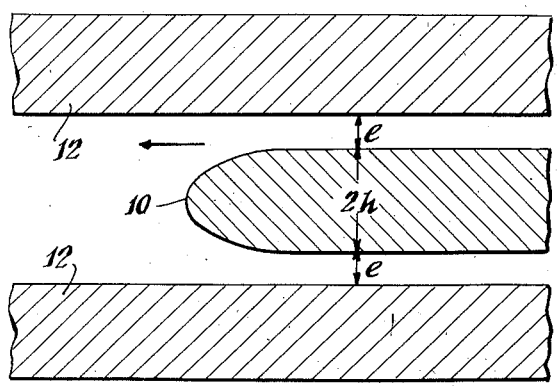
INVENTOR.
Noel Felici
BY George H. Corey
ATTORNEY Patented Sept. 26, 1950

2,523,688

UNITED STATES PATENT OFFICE 2,523,688

ELECTROSTATIC MACHINE

Noël Felici, Grenoble, France, assignor to Centre National de la Recherche Scientifique, Paris, France, a public establishment of France Application February 9, 1946, Serial No. 646,716
In France November 17, 1944

Section 1, Public Law 690, August 8, 1946
Patent expires November 17, 1964

14 Claims. (Cl. 171—329)

It is known that the working conditions of generating or driving electrostatic machines depend considerably on the fluid dielectric medium in which said machines work and that said conditions are improved when the dielectric strength of said medium is increased.

To this end it is known to use, as fluid dielectric medium, gases having a great dielectric strength such as, for instance, chlorinated or fluorinated gaseous compounds or ordinary air under pressure up to 9 abs. atm.

In order to obtain an appreciable useful power from an electrostatic machine it is necessary that the movable members of said machine move at a considerable speed, up to 28 metres per second, for instance, in the original generator of Van de Graaf because of the comparatively small electrostatic forces usefully acting on said members.

Under these conditions, the fluid friction caused by the motion of the movable members in the medium in which they are immersed becomes of great importance because the power which is thus absorbed is generally proportional to the specific mass of the medium and to the cube of the speed of the movable members. This power is dissipated in the form of heat.

Thus, the fluid friction increases much faster with increasing speed than the useful electrostatic forces; it thus limits the possible speed for the movable members and, accordingly, the power delivered by the machine for a given efficiency of the latter.

For a machine the power of which is limited only by the dielectric strength of the fluid medium in which it works, the maximum power is, for a given speed of the movable members proportional to the product $\epsilon E_m^2$, $E_m$ being the dielectric rigidity of the medium and $\epsilon$ its dielectric constant, that is to say it is proportional to the maximum density of energy in the medium which has for expression $K \epsilon E_m^2$, in which K is a constant depending on the units which have been chosen $$K = \frac{1}{8\pi}$$

in the electrostatic C. G. S. system). The maximum power appears, therefore, in the form $C_1 \epsilon E_m^2$ in which $C_1$ is a constant. The power which is lost by fluid friction is, for a given speed, proportional to the specific gravity $d$ of the medium, that is to say, it is of the form $C_2 d$, $C_2$ being another constant. The power which is lost by solid friction is, for a given speed, a constant $C_3$. As to the electric losses, means are known by which they can be rendered practically negligible in an electrostatic machine. Such means are described, more particularly, in my copending patent application, No. 646,737 of February 11, 1946, now Patent No. 2,486,140, October 25, 1949.

In a well-designed machine, solid friction can be considerably reduced by known means so that the term $C_3$ can be rendered very small with respect to the others, more particularly when the specific power of the machine with respect to the volume unit is considerable. This is the case when the maximum density of energy is relatively high and, for instance, higher than 0.004 joule per cubic centimetre, the maximum power being proportional to this maximum density of energy. Under these conditions, the efficiency of a machine is determined by the quotient $$\frac{\epsilon E_m^2}{d}$$

The greater this quotient, the higher the efficiency for an equal speed of the movable members. It is for this reason that this quotient is called hereafter "electrostatic quality" of the medium. It is expressed by measuring $E_m$ in kilovolts per centimetre and by adopting more particularly as a normal value that which results from a measure conducted under a D. C. voltage with plane and parallel electrodes of polished iron spaced 2 millimetres from each other. $d$ is measured by taking as unity the density of atmospheric air at 0° C. and under a pressure of 760 millimetres of mercury.

The introduction of this new remarkable value, viz. the so-called "electrostatic quality"

$$\frac{\epsilon E_m^2}{d}$$

makes it possible to determine a priori the advantage to be gained by the use of any medium. It thus gives a possibility of classifying them rationally for their use in electrostatic machines and indicates the direction to be follower for improving the working of such machines.

By examining various mediums from the point of view of their "electrostatic quality" the applicant has found that the gases which were used hitherto for improving the working conditions of electrostatic machines were not those which reached the highest quality and that it is thus possible to make new and important hitherto unsuspected progress.

The present invention consists in causing electrostatic generating or driving machines to work in a medium the "electrostatic quality" of which, as previously defined, is equal to or higher than 10,000 units and the maximum density of energy of which is equal to or higher than 0.004 joule per cubic centimetre, said density being calculated with the value of $E_m$ defining the electrostatic quality. The use of such a medium makes it possible to increase considerably the efficiency of electrostatic machines and to render it, for instance, higher than 90%.

By way of examples, the following gases taken at a temperature of 20° C. can be stated as being suitable for carrying out the invention:

Ordinary air under a pressure higher than 19 abs. atm.;

Nitrogen under a pressure of 19 abs. atm.;

Mixtures of said gases and, more particularly, nitrogen containing 5 to 15% of oxygen under a pressure higher than 19 abs. atm.;

Hydrogen under a pressure higher than 25 abs. atm.;

Dry ammonia gas under a pressure higher than 7 abs. atm.;

Carbon dioxide under a pressure higher than 20 abs. atm.;

Rarefied gases under a pressure lower than one hundred millionth of an atmosphere.

If the temperature differs from 20° C., the above indicated pressures are to be modified accordingly in a measure which can be easily calculated. For instance, at 60° C. they ought to be increased by 15%. Generally speaking, the pressure must vary proportionally to the absolute temperature.

Of course, the field of the invention is not limited to the preceding examples and comprises any kind of medium and more particularly any mixture or combination of the previously enumerated gases the electrostatic quality of which is equal to or higher than 10,000 units and the maximum density of energy of which is equal to or higher than 0.004 joule per cubic centimetre.

The present invention can be applied to any electrostatic machine whatever. Care must be taken, however, that no new losses appear in these machines which would be due to a failure of the solid insulating means entering into the construction or to sparks, brush discharges or coronae produced by edges, angles, projections and, generally speaking, by local shape defects of the conducting members, that is to say, that the machine be constructed rationally. For this purpose it is possible to make use of the arrangements provided for in the aforesaid copending patent application.

Fig. 1 shows a perspective view of an electrostatic machine within a casing pressurized for carrying out the invention.

Fig. 2 shows diagrammatically in section the preferred form of a conveyor electrode and two cooperating inductor electrodes in the apparatus of the invention.

The machine of Fig. 1 comprises a set of three conductive conveyors 10 secured on a shaft 11 in insulated relation to each other and to this shaft. The shaft 11 is supported for rotation in bearing 25 and in the upright member 26 of the frame 13 for rotative movement on the axis of the shaft 11 of the rotor constituted by the conveyors 10. Suitable driving means, not shown, may be used to effect rotation of the shaft 11 and of this rotor. The conveyors 10 pass during their rotation between the inductors formed of a pair of spaced conducting electrodes or plates 12 mounted in insulated relation to and on the upright member 26 of the frame 13 of the machine by means of studs 27. The studs 27 hold the plates 12 in position so that the conveyors 10 may pass into and out of the space between and into and out of face to face relation with the inductor plates 12.

As shown in Fig. 1 the frame 13 may be supported, by any suitable means, within a pressurized casing or shell 35 which may be of cylindrical form closed at its ends by heads 37 only one of which is shown in Fig. 3. The casing 35 may be constructed to withstand a pressure which in most cases when using the dielectric gaseous media above described may be 19 atmospheres or higher, thus to provide the desired dielectric strength of the selected gaseous dielectric medium confined therein which envelopes the electrodes of the machine. The machine may be operated in the manner described in the Patent No. 2,486,140 by maintaining the inductors 12 at a predetermined potential by connecting these inductors to a suitable source of electricity.

In order to secure the maximum power from the machine in accordance with the disclosure of the Patent No. 2,486,140 and to secure the desired results when using media having "electrostatic quality" as disclosed hereinabove, the electrodes may be formed as shown in Fig. 2 of the drawing to provide these electrodes with edge surfaces of convex form and preferably of such contour as to secure substantially uniform intensity of the electrostatic field upon the edge surfaces and the surfaces which are in parallel relation to each other in the conveyor and inductor electrodes. As disclosed in the patent the field intensity on the edge surfaces of the electrodes should not exceed $E_m$ and correspondingly the electrostatic pressure should not exceed $$\frac{\epsilon E_m^2}{8\pi}$$

In order to secure these conditions the thickness of the electrode is equal to or greater than twice the spacing between the electrodes, that is, $h$, the half thickness of the conveyor in Fig. 2, is greater than $e$, the spacing between the conveyor and an adjacent inductor.

As one example of the form of this electrode, $h$ may be taken as equal to 1.5 $e$. By giving to the profile of the conveyor edges a shape approximating a half ellipse the ratio of the axes of which is between 2 and 3 and the longer axis being parallel to the planes of the opposed faces of the conveyor 10 and two inductor electrodes 12, the desired uniform distribution of the electrostatic field may be secured as the conveyor moves in the direction parallel to the parallel faces of the electrodes.

It will be understood that the machine shown in Fig. 1 and above briefly described may be constructed in any suitable manner for confining as well as resisting the action of different kinds of gases herein disclosed and others which may be suitable to provide the "electrostatic quality" as above defined in order to secure the advantageous results afforded by this invention.

The present invention also concerns electrostatic generating or driving machines of any kind containing a fluid dielectric medium complying with the above set forth conditions.

The following examples which relate to a rationally designed electrostatic machine of the Toepler type with four producers and five transporter plates of 27 centimetres diameter show the results obtained by the use of the method according to the present invention;

(a) The plates being driven in rotation in air under atmospheric pressure at a speed of 1,500 R. P. M. the voltage collected at the terminals of the machine is 3.5 kilovolts and the intensity of the current which is produced is 0.35 milliampere, i. e. a power of 1.15 watts. Air friction absorbs 5 watts and solid friction due to the brushes absorbs 20 watts. The efficiency is $1.15 : 26.15 = 4.4\%$.

(b) The same machine working as a generator, according to the invention, in an atmosphere of compressed air having a pressure of 20 absolute atmospheres yields the following results: the collected voltage becomes 40 kilovolts and the intensity of the current is 4.2 milliamperes, i. e. a power of 170 watts, always at the speed of 1,500 R. P. M. Air friction absorbs 85 watts and solid friction remains equal to 20 watts. The efficiency is then $170 : 275 = 62\%$ approximately.

(c) The machine working as a generator according to the invention in an atmosphere of compressed hydrogen having a pressure of 35 absolute atmospheres at the speed of 3,000 R. P. M. yields a voltage of 31 kilovolts and an intensity of 6.5 milliamperes i. e. a power of 200 watts. Hydrogen friction absorbs 70 watts and solid friction absorbs 40 watts. The efficiency is $200 : 310 = 64\%$ approximately.

(d) The machine under consideration cannot work as a motor in air under ordinary pressure, since the electrostatic forces are then too small with respect to the frictions of every kind. But it works very well as a motor in a medium having a sufficiently great electrostatic quality. For example, in hydrogen under a pressure of 35 absolute atmospheres at 2,000 R. P. M. it absorbs 4.3 milliamperes under 30 kilovolts, or 130 watts. Hydrogen friction absorbs 25 watts and solid friction absorbs 26 watts. There remains a power of 79 watts which can be used on the shaft, thus with an efficiency of $79 : 130 = 61\%$.

What I claim is:

1. A method for improving the efficiency of generator and driving electrostatic machines, which consists in causing such a machine to work in a fluid dielectric medium the electrostatic quality $$\frac{\epsilon E_m^2}{d}$$

of which is at least equal substantially to 10,000 and the maximum density of energy of which is at least equal substantially to 0.004 joule per cubic centimetre.

2. A method of increasing the useful power of an electrostatic machine having conductive inductor and conveyor electrodes without proportionally increasing frictional losses which comprises controlling the intensity of the electrostatic field between said electrodes throughout its active extent to prevent leakage discharges therein, and operating such machine in a gaseous dielectric medium under pressure and temperature conditions equivalent to at least 19 absolute atmospheres of air at 20° C.

3. A method of increasing the output of an electrostatic machine operating in gaseous dielectric medium having a high dielectric strength which comprises compressing said gaseous dielectric medium to a pressure and at a temperature which will insure an operating efficiency corresponding to an electrostatic quality $$\frac{\epsilon E_m^2}{d}$$

of at least 10,000 and a maximum density of energy of at least 0.004 joule per cubic centimeter, and operating the electrostatic machine in such compressed dielectric medium under such operating conditions as to maintain an operating efficiency of at least about 60%.

4. The method of operating an electrostatic machine of the type having an inductor electrode of conductive material and a conveyor electrode of conductive material movable one past the other with the respective surfaces thereof in opposed spaced relation to induce an electrostatic charge on said conveyor electrode, which comprises effecting substantially uniform distribution upon the interacting surfaces of said electrodes of the electrostatic field developed therebetween, and confining in contact with said surfaces of said electrodes a fluid dielectric medium the electrostatic quality $$\frac{\epsilon E_m^2}{d}$$

of which is at least equal substantially to 10,000 and the density of energy of which is at least equal to .004 joule per cubic centimeter.

5. The method of operating an electrostatic machine of the type having an inductor electrode of conductive material and a conveyor electrode of conductive material movable one past the other with respective surfaces thereof in opposed spaced relation to induce an electric charge on said conveyor electrode, which comprises producing between said electrodes an electrostatic field substantially uniformly distributed over the interacting surfaces of both said electrodes, and confining in contact with said surfaces a gaseous dielectric medium at a pressure not substantially less than 19 atmospheres absolute when measured substantially at a temperature of 20° C.

6. The method of operating an electrostatic machine as defined in claim 5 in which said gaseous medium is air.

7. The method of operating an electrostatic machine as defined in claim 5 in which said gaseous medium is nitrogen.

8. The method of operating an electrostatic machine as defined in claim 5 in which said gaseous medium is a mixture of nitrogen and air.

9. The method of operating an electrostatic machine as defined in claim 8 in which said gaseous medium comprises also about 5 to 15% oxygen.

10. The method of operating an electrostatic machine as defined in claim 5 in which said gaseous medium is hydrogen under a pressure not substantially less than 25 atmospheres absolute when measured substantially at a temperature of 20° C.

11. The method of operating an electrostatic machine as defined in claim 5 in which said gaseous medium is carbon dioxide under a pressure not substantially less than 20 atmospheres absolute when measured substantially at a temperature of 20° C.

12. The method of operating an electrostatic machine of the type having an inductor electrode of conductive material and a conveyor electrode of conductive material movable relative to each other to induce an electrostatic charge on said conveyor electrode, said electrodes being formed and positioned to provide faces thereof in opposed parallel spaced relation to each other extending generally parallel to the direction of the relative movement of said electrodes, said electrodes being formed with a substantial thickness transversely of said parallel faces thereof and having the surfaces of the edges thereof which extend transversely of the direction of movement of convex contour adapted to distribute the electrostatic field thereover with an intensity substantially equal to that of the intensity of the field between said parallel faces, said method comprising confining in contact with said faces and said edge surfaces of said electrodes a gaseous medium at a pressure not substantially less than 19 atmospheres absolute when measured substantially at a temperature of 20° C. to provide a dielectric medium of high dielectric strength, and effecting movement of said electrodes with respect to each other in the direction parallel to said parallel faces and transversely of the edgewise extent of said edge surfaces of said electrodes.

13. An electrostatic machine which comprises an inductor electrode of conductive material and a conveyor electrode of conductive material supported for movement of one relative to the other to induce an electric charge on said conveyor electrode, said electrodes being formed and positioned to provide faces thereof in opposed parallel spaced relation to each other extending generally parallel to the direction of relative movement of said electrodes, said electrodes being formed with a substantial thickness transversely of said parallel faces thereof and having the surfaces of the edges thereof which extend transversely of said direction of movement of convex contour adapted to distribute the electrostatic field thereover with an intensity substantially equal to the intensity of the field between said parallel faces of said electrodes, and means for confining in contact with said faces and said edge surfaces of said electrodes a gaseous dielectric medium at a pressure not substantially less than 19 atmospheres absolute when measured at substantially a temperature of 20° C.

14. Method of operating an electrostatic machine of the type having an inductor electrode of conductive material and a conveyor electrode of conductive material movable one past the other with the respective surfaces thereof in opposed spaced relation to induce an electrostatic charge on said conveyor electrode, which comprises effecting substantially uniform distribution upon the interacting surfaces of said electrodes of an electrostatic field developed therebetween, and confining in contact with said surfaces of said electrodes a gaseous dielectric medium the electrostatic quality $$\frac{\epsilon E_m^2}{d}$$

of which is not substantially less than 10,000.

NOËL FELICI.

REFERENCES CITED

The following references are of record in the file of this patent:

UNITED STATES PATENTS

| Number | Name | Date |
| --- | --- | --- |
| 479,941 | Henry | Aug. 2, 1892 |
| 643,367 | Waite | Feb. 13, 1900 |
| 2,252,668 | Trump | Aug. 12, 1941 |

OTHER REFERENCES

"Standard Handbook for Electrical Engineers," 1941, seventh edition, page 408.

Certificate of Correction

Patent No. 2,523,688 — September 26, 1950

NOËL FELICI

It is hereby certified that error appears in the printed specification of the above numbered patent requiring correction as follows:

Column 1, line 38, for the word "rigidity" read *strength*; column 2, line 44, for "follower" read *followed*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*